US012192919B2

(12) United States Patent
Faxér

(10) Patent No.: US 12,192,919 B2
(45) Date of Patent: Jan. 7, 2025

(54) CODEBOOK SUBSET RESTRICTION FOR FREQUENCY-PARAMETERIZED LINEAR COMBINATION CODEBOOKS

(71) Applicant: Telefonaktiebolaget LM Ericsson (publ), Stockholm (SE)

(72) Inventor: Sebastian Faxér, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 352 days.

(21) Appl. No.: 17/632,410

(22) PCT Filed: Aug. 6, 2020

(86) PCT No.: PCT/EP2020/072155
§ 371 (c)(1),
(2) Date: Feb. 2, 2022

(87) PCT Pub. No.: WO2021/023824
PCT Pub. Date: Feb. 11, 2021

(65) Prior Publication Data
US 2022/0303919 A1 Sep. 22, 2022

Related U.S. Application Data

(60) Provisional application No. 62/884,053, filed on Aug. 7, 2019.

(51) Int. Cl.
*H04W 52/42* (2009.01)
*H04B 7/0456* (2017.01)
(Continued)

(52) U.S. Cl.
CPC ........ *H04W 52/367* (2013.01); *H04B 7/0465* (2013.01); *H04B 7/0626* (2013.01); *H04B 7/0634* (2013.01); *H04W 52/42* (2013.01)

(58) Field of Classification Search
CPC .. H04W 52/367; H04W 52/42; H04B 7/0465; H04B 7/0626; H04B 7/0634
(Continued)

(56) References Cited

U.S. PATENT DOCUMENTS

2011/0059703 A1* 3/2011 Hugl ................... H04B 7/0417
455/73
2011/0274188 A1* 11/2011 Sayana ............. H04L 25/03343
375/260

(Continued)

OTHER PUBLICATIONS

International Search Report and Written Opinion dated Jan. 22, 2021 for International Application No. PCT/EP2020/072155 filed Aug. 6, 2020, consisting of 22-pages.
(Continued)

*Primary Examiner* — Jean A Gelin
(74) *Attorney, Agent, or Firm* — Weisberg I.P. Law, P.A.

(57) ABSTRACT

A wireless device, a network node and methods are disclosed. According to one aspect, a method includes receiving an indication of a maximum power level associated with a spatial-domain basis vector. The method includes determining whether a combination of values of the plurality of amplitude coefficients results in exceeding the maximum power level. The method further includes, responsive to determining that a combination of values of the plurality of amplitude coefficients results in exceeding the maximum power level, not reporting the combination of values in a channel state information, CSI, report.

22 Claims, 12 Drawing Sheets

(51) Int. Cl.
*H04B 7/06* (2006.01)
*H04W 52/36* (2009.01)

(58) Field of Classification Search
USPC .......................................................... 370/318
See application file for complete search history.

(56) References Cited

U.S. PATENT DOCUMENTS

| | | | | |
|---|---|---|---|---|
| 2014/0376652 | A1* | 12/2014 | Sayana | H04B 7/0456 375/267 |
| 2016/0072562 | A1* | 3/2016 | Onggosanusi | H04B 7/0479 370/329 |
| 2016/0294454 | A1* | 10/2016 | Onggosanusi | H04B 7/065 |
| 2020/0007206 | A1* | 1/2020 | Zhang | H04B 7/0482 |
| 2020/0177254 | A1* | 6/2020 | Lee | H04W 76/27 |
| 2020/0186207 | A1* | 6/2020 | Davydov | H04B 7/0469 |
| 2020/0295813 | A1* | 9/2020 | Rahman | H04B 7/0626 |
| 2020/0358496 | A1* | 11/2020 | Mittal | H04B 7/0695 |
| 2021/0321446 | A1* | 10/2021 | Lee | H04W 72/54 |
| 2022/0239362 | A1* | 7/2022 | Yuan | H04B 7/0486 |

OTHER PUBLICATIONS

3GPP TSG RAN WG1 Meeting #97 R1-1906033 Title: Codebook subset restriction for DFT-based compression codebook; Agenda Item: 7.2.8.5; Source: Huawei, HiSilicon; Document for: Discussion and Decision; Location and Date: Reno, USA, May 13-17, 2019, consisting of 4-pages.

3GPP TSG RAN WG1 Meeting #92 R1-1803166 Title: WF on CBSR for Advanced CSI Codebook; Agenda item 6.1.4; Source: Ericsson, Huawei, HiSilicon, Samsung, Intel, Qualcomm, LGE, Nokia, NSB; Location and Date: Athens, Greece, Feb. 26-Mar. 2, 2018, consisting of 3-pages.

3GPP TSG RAN WG1 Meeting #97 R1-1906344 Title: Details on Type II CSI enhancement; Source: CATT; Agenda Item: 7.2.8.1; Document for: Discussion and Decision; Location and Date: Reno, USA, May 13-17, 2019, consisting of 12 pages.

3GPP TSG RAN WG1 #90 R1-1712546 Title: Discussion on codebook subset restriction for NR; Source: Intel Corporation; Agenda item: 6.1.2.2.3; Document for: Discussion and Decision; Location and Date: Prague, Czech Republic Aug. 21-25, 2017, consisting of 4 pages.

* cited by examiner

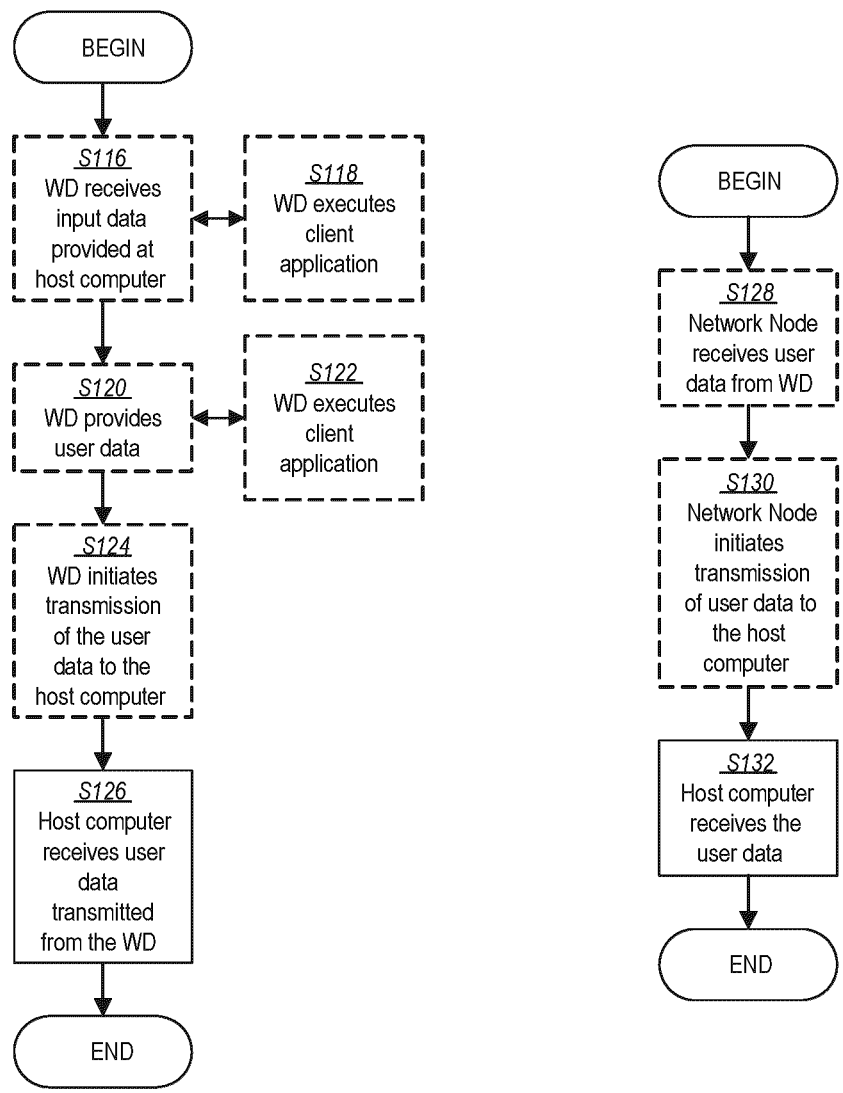

CODEBOOK SUBSET RESTRICTION FOR FREQUENCY-PARAMETERIZED LINEAR COMBINATION CODEBOOKS

CROSS-REFERENCE TO RELATED APPLICATIONS

This application is a Submission Under 35 U.S.C. § 371 for U.S. National Stage Patent Application of International Application No.: PCT/EP2020/072155, filed Aug. 6, 2020 entitled "CODEBOOK SUBSET RESTRICTION FOR FREQUENCY-PARAMETERIZED LINEAR COMBINATION CODEBOOKS," which claims priority to U.S. Provisional Application No. 62/884,053, filed Aug. 7, 2019, entitled "CODEBOOK SUBSET RESTRICTION FOR FREQUENCY-PARAMETERIZED LINEAR COMBINATION CODEBOOKS," the entireties of both of which are incorporated herein by reference.

FIELD

The present disclosure relates to wireless communications, and in particular, to codebook subset restriction for frequency-parameterized linear combination codebooks.

BACKGROUND

Multi-antenna techniques can significantly increase the data rates and reliability of a wireless communication system as compared with single antenna communications. The performance is in particular improved if both the transmitter and the receiver are equipped with multiple antennas, which results in a multiple-input multiple-output (MIMO) communication channel. Such systems and/or related techniques are commonly referred to as MIMO.

The $3^{rd}$ Generation Partnership Project (3GPP) New Radio (NR) (also known as "5G") standard is currently evolving with enhanced MIMO support. A component in NR is the support of MIMO antenna deployments and MIMO related techniques such as spatial multiplexing. The spatial multiplexing mode is for high data rates in favorable channel conditions. An illustration of the spatial multiplexing operation is provided in FIG. 1.

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and is typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

NR uses orthogonal frequency division multiplexing (OFDM) in the downlink (and discrete Fourier transform (DFT) precoded OFDM in the uplink) and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the WD.

In closed-loop precoding for the NR downlink, the wireless device (WD) transmits, based on channel measurements in the forward link (downlink), recommendations to the gNB of a suitable precoder to use. The gNB configures the WD to provide feedback according to CSI-ReportConfig and may transmit CSI-RS and configure the WD to use measurements of CSI-RS to feed back recommended precoding matrices that the WD selects from a codebook. A single precoder that is supposed to cover a large bandwidth (wideband precoding) may be fed back. It may also be beneficial to match the frequency variations of the channel and instead feed back a frequency-selective precoding report, e.g., several precoders, one per subband. This is an example of the more general case of channel state information (CSI) feedback, which also encompasses feeding back other information than recommended precoders to assist the base station (gNodeB) in subsequent transmissions to the WD. Such other information may include channel quality indicators (CQIs) as well as transmission rank indicator (RI). In NR, channel state information (CSI) feedback can be either wideband, where one CSI is reported for the entire channel bandwidth, or frequency-selective, where one CSI is reported for each subband, which is defined as a number of contiguous resource blocks ranging between 4 and 32 physical resource blocks (PRB) depending on the band width part (BWP) size.

Given the CSI feedback from the WD, the New Radio base station (gNB) determines the transmission parameters it wishes to use to transmit to the WD, including the precoding matrix, transmission rank, and modulation and coding scheme (MCS). These transmission parameters may differ from the recommendations the WD makes. The transmission rank, and thus the number of spatially multiplexed layers, is reflected in the number of columns of the precoder W. For efficient performance, it may be important that a transmission rank that matches the channel properties is selected.

Two-dimensional antenna arrays may be used in both the base station and the WD. Such antenna arrays may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antennas is thus $N = N_h N_v N_p$. Note that the concept of an antenna is non-limiting in the sense that it can refer to any virtualization (e.g., linear mapping) of the physical antenna elements. For example, pairs of physical sub-elements could be fed the same signal, and hence share the same virtualized antenna port. FIG. 2 shows a two dimensional array of cross polarized antenna elements.

Precoding may be interpreted as multiplying the signal with different beamforming weights for each antenna prior to transmission. A typical approach is to tailor the precoder to the antenna form factor, i.e. taking into account $N_h$, $N_v$ and $N_p$ when designing the precoder codebook.

For CSI measurement and feedback, CSI reference signals (CSI-RS) are defined. A CSI-RS is transmitted on each transmit antenna (or antenna port) and is used by a WD to measure downlink channel between each of the transmit antenna ports and each of its receive antenna ports. The antenna ports are also referred to as CSI-RS ports. The supported number of antenna ports in NR are {1,2,4,8,12, 16,24,32}. By measuring the received CSI-RS, a WD can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain resource elements (RE) in a slot and certain slots. FIG. 3 shows an example of CSI-RS REs for 12 antenna ports, where 1RE per resource block (RB) per port is shown.

In addition, an interference measurement resource (IMR) is also defined in NR for a WD to measure interference. An IMR resource contains 4 REs, either 4 adjacent RE in frequency in the same OFDM symbol or 2 by 2 adjacent REs in both time and frequency in a slot. By measuring both the channel based on NZP CSI-RS and the interference based on an IMR, a WD can estimate the effective channel and noise plus interference to determine the CSI, i.e., rank, precoding matrix, and the channel quality.

Furthermore, a WD in NR may be configured to measure interference based on one or multiple NZP CSI-RS resource.

In NR, a WD can be configured with multiple CSI reporting settings and multiple CSI-RS resource settings. Each resource setting can contain multiple resource sets, and each resource set can contain up to 8 CSI-RS resources. For each CSI reporting setting, a WD feeds back a CSI report. Each CSI reporting setting may contain at least the following information:

A CSI-RS resource set for channel measurement;
An IMR resource set for interference measurement;
Optionally, a CSI-RS resource set for interference measurement;
Time-domain behavior, i.e. periodic, semi-persistent, or aperiodic reporting;
Frequency granularity, i.e. wideband or subband;
CSI parameters to be reported such as RI, PMI, CQI, and CSI-RS resource indicator (CRI) in case of multiple CSI-RS resources in a resource set;
Codebook types, i.e. type I or II, and codebook subset restriction;
Measurement restriction;
Subband size. One out of two possible subband sizes is indicated, the value range depending on the bandwidth of the BWP. One CQI/PMI (if configured for subband reporting) is fed back per subband).

Furthermore, a WD in NR may be configured to measure interference based on one or multiple NZP CSI-RS resource. When the CSI-RS resource set in a CSI reporting setting contains multiple CSI-RS resources, one of the CSI-RS resources is selected by a WD and a CSI-RS resource indicator (CRI) is also reported by the WD to indicate to the gNB about the selected CSI-RS resource in the resource set, together with RI, PMI and CQI associated with the selected CSI-RS resource.

For aperiodic CSI reporting in NR, more than one CSI reporting settings, each with a different CSI-RS resource set for channel measurement and/or resource set for interference measurement can be configured and triggered at the same time. In this case, multiple CSI reports are aggregated and sent from the WD to the gNB in a single physical uplink shared channel (PUSCH).

A common type of precoding is to use a DFT-precoder, where the precoder vector used to precode a single-layer transmission using a single-polarized uniform linear array (ULA) with N antennas is defined as $$w_{1D}(k) = \frac{1}{\sqrt{N}} \begin{bmatrix} e^{j2\pi \cdot 0 \cdot \frac{k}{QN}} \\ e^{j2\pi \cdot 1 \cdot \frac{k}{QN}} \\ \vdots \\ e^{j2\pi \cdot (N-1) \cdot \frac{k}{QN}} \end{bmatrix},$$

where k=0, 1, . . . QN-1 is the precoder index and Q is an integer oversampling factor. A corresponding precoder vector for a two-dimensional uniform planar array (UPA) can be created by taking the Kronecker product of two precoder vectors as $w_{2D}(k, l) = w_{1D}(k) \otimes w_{1D}(l)$. Extending the precoder for a dual-polarized UPA may then be done as $$w_{2D,DP}(k, l, \phi) = \begin{bmatrix} 1 \\ e^{j\phi} \end{bmatrix} \otimes w_{2D}(k, l) = \begin{bmatrix} w_{2D}(k, l) \\ e^{j\phi} w_{2D}(k, l) \end{bmatrix} = \begin{bmatrix} w_{2D}(k, l) & 0 \\ 0 & w_{2D}(k, l) \end{bmatrix} \begin{bmatrix} 1 \\ e^{j\phi} \end{bmatrix},$$

where $e^{j\phi}$ is a co-phasing factor that may for instance be selected from QPSK alphabet $\phi \in$ $$\left\{ 0, \frac{\pi}{2}, \pi, \frac{3\pi}{2} \right\}.$$

A precoder matrix $W_{2D,DP}$ for multi-layer transmission may be created by appending columns of DFT precoder vectors as $W_{2D,DP} = [w_{2D,DP}(k_1, l_1, \phi_1) \; w_{2D,DP}(k_2, l_2, \phi_2) \; \ldots \; w_{2D,DP}(k_R, l_R, \phi_R)],$ where R is the number of transmission layers, i.e. the transmission rank. In a common special case for a rank-2 DFT precoder, $k_1 = k_2 = k$ and $l_1 = l_2 = l$, meaning that $$W_{2D,DP} = [w_{2D,DP}(k, l, \phi_1) \; w_{2D,DP}(k, l, \phi_2)] = \begin{bmatrix} w_{2D}(k, l) & 0 \\ 0 & w_{2D}(k, l) \end{bmatrix} \begin{bmatrix} 1 & 1 \\ e^{j\phi_1} & e^{j\phi_2} \end{bmatrix}.$$

Such DFT-based precoders are used for instance in NR Type I CSI feedback.

With multi-user MIMO, two or more users in the same cell are co-scheduled on the same time-frequency resource. That is, two or more independent data streams are transmitted to different WDs at the same time, and the spatial domain is used to separate the respective streams. By transmitting several streams simultaneously, the capacity of the system can be increased. However, this comes at the cost of reducing the signal to interference and noise ratio (SINR) per stream, as the power must be shared between streams and the streams will cause interference to each-other.

One aspect of MU-MIMO is to obtain accurate CSI that enables nullforming between co-scheduled users. Therefore, support has been added in Long Term Evolution (LTE) 3GPP Technical Release 14 (Rel.14) and NR 3GPP Technical Release 15 (Rel.15) for codebooks that provides more detailed CSI than the traditional single DFT-beam precoders. These codebooks are referred to as Advanced CSI (LTE) or Type II codebooks (NR) and can be described as a set of precoders where each precoder is created from multiple DFT beams. A multi-beam precoder may be defined as a linear combination of several DFT precoder vectors as $$W = \sum_i c_i \cdot W_{2D,DP}(k_i, l_i, \phi_i),$$

where $\{c_i\}$ may be general complex coefficients. Such a multi-beam precoder may more accurately describe the WD's channel and may thus bring an additional performance benefit compared to a DFT precoder, especially for MU-MIMO where rich channel knowledge is desirable in order to perform nullforming between co-scheduled WDs.

For the NR Type II codebook in 3GPP Technical Release 15 (Rel-15), the precoding vector for each layer and subband is expressed in 3GPP Technical Standard 38.214 as:

$$W^l_{q_1,q_2,n_1,n_2 p_l^{(1)}, p_l^{(2)}, c_l} = \frac{1}{\sqrt{N_1 N_2 \sum_{i=0}^{2L-1}\left(p_{l,i}^{(1)} p_{l,i}^{(2)}\right)^2}} \begin{bmatrix} \sum_{i=0}^{L-1} v_{m_1^{(i)}, m_2^{(i)}} p_{l,i}^{(1)} p_{l,i}^{(2)} \varphi_{l,i} \\ \sum_{i=0}^{L-1} v_{m_1^{(i)}, m_2^{(i)}} p_{l,i+L}^{(1)} p_{l,i+L}^{(2)} \varphi_{l,i+L} \end{bmatrix}, l = 1, 2$$

If above formula is restricted and is expressed more simply, the precoder vector $w_{l,p}(k)$ can be formed for a certain layer l=0,1, polarization p=0,1 and resource block k=0, ..., $N_{RB}$-1 as $$w_{l,p}(k) = \frac{1}{C} \sum_{i=0}^{L-1} v_i p_{l,i}^{(1)} c_{l,i}(k) \text{ where } c_{l,i}(k) =$$

$$p_{l,i}^{(2)}\left(\left\lfloor \frac{k}{s} \right\rfloor\right) \varphi_{l,i}\left(\left\lfloor \frac{k}{s} \right\rfloor\right) \text{ for } p = 0 \text{ and } c_{l,i}(k) = p_{l,L+i}^{(2)}\left(\left\lfloor \frac{k}{s} \right\rfloor\right) \varphi_{l,L+i}\left(\left\lfloor \frac{k}{s} \right\rfloor\right) \text{ for } p = 1,$$

S is the subband size and $N_{SB}$ is the number of subbands in the CSI reporting bandwidth. Hence, the change in a beam coefficient across frequency $c_{l,i}(k)$ is determined based on the $2N_{SB}$ parameters $p_{l,i}^{(2)}(0), \ldots, p_{l,i}^{(2)}(N_{SB}-1)$ and $\varphi_{l,i}(0), \ldots, \varphi_{l,i}(N_{SB}-1)$. Where the subband amplitude parameter $p_{l,i}^{(2)}$ is quantized using 0-1 bit and the subband phase parameter $\varphi_{l,i}$ is quantized using 2-3 bits, depending on codebook configuration.

For NR Rel-16 Type II, an overhead reduction mechanism has been specified. The rationale is that it has been observed that there is a strong correlation between different values of $c_{l,i}$ for different subbands, and one could exploit this correlation to perform efficient compression in order to reduce the number of bits required to represent the information. This would thus lower the amount of information which needs to be signaled from the WD to the gNB which is relevant from several aspects. The agreed codebook design for NR Rel-16 Type II codebook can be described as follows:

Precoder vectors for all frequency division (FD)-units/subbands for a layer is given by size-P×$N_3$ matrix $W=[w^{(0)} \ldots w^{(N_3-1)}]=W_1 \tilde{W}_2 W_f^H$:
P=$2N_1 N_2$=#SD dimensions (number of antenna ports);
$N_3$=$N_{SB}$×R=#FD dimensions (number of PMI subbands);

The value R={1,2} (PMI subband size indicator) is Radio Resource Control (RRC) configured;
$N_{SB}$ is the number of channel quality indicator (CQI) subbands;
This applies for $N_{SB}$×R≤13;
$W_1$ is size-P×2L spatial compression matrix;
$W_f$ is size-$N_3$×M frequency compression matrix;
$\tilde{W}_2$ is size 2L×M coefficient matrix;
Precoder normalization: the precoding matrix for given rank and unit of $N_3$ is normalized to norm 1/sqrt (rank);
RI ($\in \{1, \ldots, R_{MAX}\}$) is reported in uplink control information (UCI) Part 1;
Spatial domain (SD) compression by $W_1$:
L spatial domain basis vectors (mapped to the two polarizations, so 2L in total) selected;
Compression in spatial domain using $$W_1 = \begin{bmatrix} v_0 v_1 \ldots v_{L-1} & 0 \\ 0 & v_0 v_1 \ldots v_{L-1} \end{bmatrix};$$

here $\{v_l\}_{l=0}^{L-1}$ are $N_1 N_2$×1 orthogonal DFT vectors (same as Rel. 15 Type II) from rotated DFT basis;
4 rotation hypotheses per spatial dimension corresponding to 4× oversampling;
SD-basis selection is layer-common;
The value of L={2,4,6} (number of "beams", SD-basis vectors) is RRC configured;
L=6 only supported for limited parameter setting:
32 Tx, R=1, (p, β) ∈{(1/4, 1/4), (1/4, 1/2), (1/4, 3/4), (1/2, 1/4)};
Frequency-domain (FD) compression by $W_f$;
Compression via $W_f=[f_{k_0} f_{k_1} \ldots f_{k_{M-1}}]$, where $\{f_{k_m}\}_{m=0}^{M-1}$ are M size-$N_3$×1 orthogonal DFT vectors;
Number of FD-components M=⌈p×$N_3$/R⌉, where p=$y_0$ for RI=1-2 and p=$v_0$ for RI=3-4;
The parameters ($y_0$, $v_0$) are jointly configured in RRC and take values from {(1/2, 1/4), (1/4, 1/4), (1/4, 1/8)};
FD-basis selection is layer-specific but uses a layer-common intermediary subset for N3>19;
For $N_3$<19, one-step free selection is used;
FD-basis selection per layer indicated with a $$\left\lceil \log_2 \binom{N_3 - 1}{M_i - 1} \right\rceil$$

bit combinatorial indicator;
For $N_3$>19, two-step selection with layer-common intermediary subset (IntS) is used;
A window-based IntS which is fully parameterized with $M_{initial}$, indicating that the intermediate basis set consists of FD bases mod($M_{initial}$+n, $N_3$), n=0,1, ... $N_3$'-1;
For Future Study (FFS): details on bitwidth and possible values for $M_{initial}$ reporting in UCI part 2;
FFS: whether the possible value(s) for $M_{initial}$ can depend on configured FD compression parameters;
The value $N_3'=⌈αM⌉$ where α is higher-layer configured from two possible values;

Candidate values for α to be down selected/evaluated: at least {1.5, 2, 2.5};

The set of values is to be finalized via offline email discussion prior to RAN1#98;

Configuration of α;

Whether it is independent of other FD compression parameters, or dependent on at least one of the other FD compression parameters, i.e. p (=$y_0$, and/or $v_0$ for RI=3-4), L, β, and/or R;

Whether α is rank-specific or rank-common;

Note: This is to be discussed along with the supported parameter combinations for (L, p, β, α);

The 2$^{nd}$ step subset selection is indicated by an $$\left\lceil \log_2 \binom{N_3' - 1}{M_i - 1} \right\rceil \text{-bit}$$

combinatorial indicator (for each layer) in UCI part 2;

Linear combination by $\tilde{W}_2$ (for a layer i);

$$\tilde{W}_2 = \begin{bmatrix} c_{0,0} & \cdots & c_{0,M-1} \\ \vdots & \ddots & \vdots \\ c_{2L-1,0} & \cdots & c_{2L-1,M-1} \end{bmatrix}$$

is composed of K=2LM$_i$ linear combination coefficients;

Coefficient subset selection;

Only a subset $K_{NZ,i} \leq K_0 < 2LM_i$ coefficients are non-zero and reported;

The $2LM_i - K_{NZ,i}$ non-reported coefficients are zero and not reported;

The maximum number of non-zero coefficients per layer is $K_0 = \lceil \beta \times 2LM_0 \rceil$;

β∈{1/4, 1/2, 3/4} is RRC configured;

For RI={2,3,4}, the total max # NZ coefficients across all layers≤2$K_0$;

Coefficient subset selection, for each layer i is indicated with a size-2LM$_i$ bitmap with $K_{NZ,i}$ ones in uplink control information (UCI) Part 2;

Indication of $K_{NZ,TOT}$ (the total number of non-zero coefficients summed across all the layers, where $K_{NZ,TOT} \in \{1,2,\ldots,2K_0\}$) is given in UCI Part 1, so that UCI Part 2 payload can be known;

Coefficient quantization according to $$c_{l,m} = p_{ref}\left(\left\lfloor \frac{l}{L} \right\rfloor\right) \times p(l,m) \times \varphi(l,m);$$

Strongest coefficient: Strongest coefficient $c_{l^*,m8}=1$ (hence its amplitude/phase is not reported) indicated with a per-layer SCI;

For RI=1, a $\lceil \log_2 K_{NZ,0} \rceil$-bit indicator for the strongest coefficient index, SCI, (l*, m*);

For RI>1, a $\lceil \log_2 2L \rceil$-bit (i=0,1, . . . (RI-1)). The location (index) of the strongest LC coefficient for layer i before index remapping is ($l_i^*$, $m_i^*$), SCI=$l_i^*$, and $m_i^*$ is not reported;

Index remapping:

For layer i, the index $m_i$ of each nonzero LC coefficient $c_{l_i,m_i}$ is remapped with respect to $m_i^*$ to $\tilde{m}_i$ such that $\tilde{m}_i^*=0$. The FD basis index $k_{m_i}$ associated to each nonzero LC coefficient $c_{l_i,m_i}$ is remapped with respect to $k_{m_i^*}$ to $\tilde{k}_{m_i}$ such that $\tilde{k}_{m_i^*}=0$. The sets $\{c_{l_i,\tilde{m}_i} \neq c_{l_i^*,0}\}$ and $\{\tilde{k}_{m_i} \neq 0\}$ are reported;

Informative note (for the purpose of reference procedure): The index ($l_i$, $m_i$) of nonzero LC coefficients is remapped as ($l_i$, $m_i$)→($l_i$, ($m_i$$m_i^*$) mod $M_i$). The codebook index associated with nonzero LC coefficient index ($l_i$, $m_i$) is remapped as $k_{m_i}$→($k_{m_i}$-$k_{m_i^*}$)mod $N_3$;

Two polarization-specific reference amplitudes $p_{ref}(0)$, $p_{ref}(1)$;

For the polarization associated with the strongest coefficient $$p_{ref}\left(\left\lfloor \frac{l^*}{L} \right\rfloor\right) = 1$$

and hence not reported;

For the other polarization, the reference amplitude is quantized to 4 bits;

The alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, \text{"reserved"}\right\}$$

(−1.5 dB step size);

For $\{c_{l,m}, (l, m) \neq (l^*, m^*)\}$:

For each polarization, differential amplitudes p(l, m) of the coefficients calculated relative to the associated polarization-specific reference amplitude and quantized to 3 bits;

The alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}$$

(−3 dB step size)

Each phase φ(l, m) is quantized to either 8PSK (3-bit) or 16PSK (4-bit) (configurable);

The agreed codebook structure, utilizing both SD and FD compression is illustrated in FIG. 4.

Codebook Subset Restrictions (CBSR) have been specified for all Long Term Evolution (LTE) and NR codebooks so far. The CBSR indicates that a WD is not allowed to select certain entries from the precoder codebook, i.e., it restricts the precoder matrix indicator (PMI) selection. This is useful for instance to control interference in certain spatial (beam) directions (for instance pointing to WDs of a neighboring cell) by restricting a WD from selecting a PMI corresponding to these directions. The CBSR is typically RRC configured to the WD in conjunction with configuring which precoder codebook to use for the CSI feedback. As the codebooks have gotten more and more complicated, the indication of CBSR has consumed more signaling overhead and various schemes have been devised to reduce the signaling load.

For instance, in order to reduce codebook subset restriction (CBSR) signaling overhead, LTE FD-MIMO, as well as NR Type I CSI feedback, uses beam-based rank-agnostic CBSR signaling as opposed to PMI-based per-rank CBSR as was used in earlier releases of LTE. In PMI-based per-rank CBSR, precoders are restricted by signaling one or more bitmaps for each rank (i.e. 8 sets of bitmaps for ranks 1-8) and each bit in the bitmap restricts one PMI index (e.g. i1 or i2) for the codebook of a specific rank.

With beam-based rank-agnostic CBSR, on the other hand, the constituent 2D DFT beams $v_{l,m}$ are restricted instead, resulting in a size $N_1N_2O_1O_2$ bitmap where each bit restricts a certain $(l_0, m_0)$ index pair, corresponding to the beam $v_{l_0,m_0}$. Since the quantity $v_{l,m}$ are the constructing blocks for precoders of all ranks, a substantial overhead reduction in CBSR signaling is attained. A precoder in the codebook is restricted if any of the restricted beams $v_{l,m}$ is present in the precoder.

While the Type I CBSR uses beam restriction directly, with a size $N_1N_2O_1O_2$ bitmap being signaled, where each bit in the bitmap corresponds to the restriction of a 2D DFT beam $v_{l,m}$, the Rel-15 Type II CBSR uses joint beam and wideband amplitude restriction where the beam restriction is constrained so that only P=4 size N1*N2 beam groups can be restricted. This is a quite complicated scheme which is illustrated in FIG. 5 below. In essence, in a first step, out of the total $N_1N_2O_1O_2$ spatial beams available, a subset of $4N_1N_2$ are indicated. It is only this subset of beams which may be further restricted, the remaining $N_1N_2O_1O_2-4N_1N_2$ beams can be freely selected by the WD to construct the precoder. In the second step, a maximum power (or really, amplitude) level is indicated respectively for each beam in the subset. The beam-specific indicated maximum power level sets a cap for what the maximum value for the wideband amplitude coefficient $p_{l,i}^{(1)}$ can be set to, if that beam is selected to be included in the precoder. This maximum value applies individually for both polarizations of the spatial beam as well as both layers.

CBSR has been considered for the 3GPP Technical Release 16 (Rel-16) Type II codebook based on frequency-domain parametrization. However, the CBSR for the 3GPP Rel-15 Type II codebook cannot be applied to the 3GPP Rel-16 Type II codebook because the 3GPP Rel-16 codebook has a different structure. Therefore, how to design a CBSR mechanism for the 3GPP Rel-16 Type II codebook remains a problem.

SUMMARY

Some embodiments advantageously provide methods, systems, and apparatuses for codebook subset restriction for frequency-parameterized linear combination codebooks.

In some embodiments, the maximum power level for each of multiple spatial beams is signaled to the WD as part of the CBSR signaling. In some embodiments, the CBSR mechanism defines a rule that the ratio of the sum of all the (squares of) amplitude coefficients for the different FD-components associated with a beam does not exceed a threshold. The 3GPP Rel-16 Type II PMI feedback from the WD can be effectively controlled to suppress the transmitted energy in certain spatial directions without incurring a large CBSR signaling overhead.

Thus, according to one aspect, a method in a network node for codebook subset restriction, CBSR, includes jointly restricting a maximum power level of a plurality of amplitude coefficients associated with a spatial-domain basis vector based at least on part on a maximum power threshold associated with a beam corresponding to the spatial-domain basis vector. The method further includes indicating the maximum power level to a wireless device, WD.

According to this aspect, in some embodiments, the jointly restricting includes restricting a sum of squares of the amplitude coefficients to be less than the maximum power threshold. In some embodiments, the jointly restricting includes restricting a sum of squares of the amplitude coefficients relative to a total power of a precoder to be less than the maximum power threshold. In some embodiments, the jointly restricting includes restricting a square root of a sum of squares of the amplitude coefficients to be less than the maximum power threshold. In some embodiments, the jointly restricting is applied to multiple layers of transmission. In some embodiments, the jointly restricting is applied separately for each of a plurality of layers of transmission. In some embodiments, the jointly restricting is applied separately for each of a plurality of polarizations. In some embodiments, the jointly restricting is applied separately for each of a plurality of sets of antenna ports. In some embodiments, the jointly restricting is applied for each of a plurality of beams in a subset of beams. In some embodiments, the indicating includes indicating a maximum power level and indicating for which beams in the subset of beams the maximum power level applies. In some embodiments, a maximum power threshold associated with a beam is selected from a range that includes zero, zero indicating that the beam is not to be used by the WD.

According to another aspect, a network node for codebook subset restriction, CBSR, is provided. The network node includes processing circuitry configured to jointly restrict a maximum power level of a plurality of amplitude coefficients associated with a spatial-domain basis vector based at least in part on a maximum power threshold associated with a beam corresponding to the spatial-domain basis vector. The network node also includes a radio interface in communication with the processing circuitry, the radio interface configured to indicate the maximum power level to a wireless device, WD.

In some embodiments, the jointly restricting includes restricting a sum of squares of the amplitude coefficients to be less than the maximum power threshold. In some embodiments, the jointly restricting includes restricting a sum of squares of the amplitude coefficients relative to a total power of a precoder to be less than the maximum power threshold. In some embodiments, the jointly restricting includes restricting a square root of a sum of squares of the amplitude coefficients to be less than the maximum power threshold. In some embodiments, the jointly restricting is applied to multiple layers of transmission. In some embodiments, the jointly restricting is applied separately for each of a plurality of layers of transmission. In some embodiments, the jointly restricting is applied separately for each of a plurality of polarizations. In some embodiments, the jointly restricting is applied separately for each of a plurality of sets of antenna ports. In some embodiments, the jointly restricting is applied for each of a plurality of beams in subset of beams. In some embodiments, the indicating includes indicating a maximum power level and indicating for which beams in the subset of beams the maximum power level applies. In some embodiments, a maximum power threshold associated with a beam is selected from a range that includes zero.

According to yet another aspect, a method in a wireless device, WD, for codebook subset restriction, CBSR, is provided. The method includes receiving an indication of a maximum power level associated with a spatial-domain basis vector. The method also includes determining whether a combination of values of the plurality of amplitude coefficients results in exceeding the maximum power level. The method also includes responsive to determining that a combination of values of the plurality of amplitude coefficients results in exceeding the maximum power level, not reporting the combination of values in a channel state information, CSI, report.

According to this aspect, in some embodiments, the determining includes determining when a sum of squares of the amplitude coefficients is less than the maximum power threshold. In some embodiments, the determining includes determining when a sum of squares of the amplitude coefficients relative to a total power of a precoder is less than the maximum power threshold. In some embodiments, the determining includes determining when a square root of a sum of squares of the amplitude coefficients is less than the maximum power threshold. In some embodiments, the determining is applied to multiple layers of transmission. In some embodiments, the determining is applied separately for each of a plurality of layers of transmission. In some embodiments, the determining is applied separately for each of a plurality of polarizations. In some embodiments, the determining is applied separately for each of a plurality of sets of antenna ports. In some embodiments, the determining is applied for each of a plurality of beams in a subset of beams. In some embodiments, the determining includes determining which beams in the subset of beams the maximum power level applies. In some embodiments, the determining includes comparing the combination of values to a maximum power threshold selected from a range that includes zero. In some embodiments, the maximum power level is relative to a total precoder power. In some embodiments, the maximum power level is associated with a particular one of a plurality of polarizations. In some embodiments, the maximum power level is associated with a particular transmission layer. In some embodiments, the maximum power level is associated with a group of transmission layers.

According to another aspect, a WD, for codebook subset restriction, CBSR, is provided. The WD includes a radio interface configured to receive an indication of a maximum power level associated with a spatial-domain basis vector. The WD also includes processing circuitry in communication with the radio interface, the processing circuitry configured to: determine whether a combination of values of the plurality of amplitude coefficients results in exceeding the maximum power level; and responsive to the determining that a combination of values of the plurality of amplitude coefficients results in exceeding the maximum power level, not report the combination of values in a channel state information, CSI, report.

According to this aspect, in some embodiments, the determining includes determining when a sum of squares of the amplitude coefficients is less than the maximum power threshold. In some embodiments, the determining includes determining when a sum of squares of the amplitude coefficients relative to a total power of a precoder is less than the maximum power threshold. In some embodiments, the determining includes determining when a square root of a sum of squares of the amplitude coefficients is less than the maximum power threshold. In some embodiments, the determining is applied to multiple layers of transmission. In some embodiments, the determining is applied separately for each of a plurality of layers of transmission. In some embodiments, the determining is applied separately for each of a plurality of polarizations. In some embodiments, the determining is applied separately for each of a plurality of sets of antenna ports. In some embodiments, the determining is applied for each of a plurality of beams in a subset of beams. In some embodiments, the determining includes determining which beams in the subset of beams the maximum power level applies. In some embodiments, the determining includes comparing the combination of values to a maximum power threshold selected from a range that includes zero. In some embodiments, the maximum power level is relative to a total precoder power. In some embodiments, the maximum power level is associated with a particular one of a plurality of polarizations. In some embodiments, the maximum power level is associated with a particular transmission layer. In some embodiments, the maximum power level is associated with a group of transmission layers.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 10 is a flowchart illustrating example methods implemented in a communication system including a host computer, a network node and a wireless device for receiving user data from the wireless device at a host computer according to some embodiments of the present disclosure;

FIG. 11 is a flowchart illustrating example methods implemented in a communication system including a host computer, a network node and a wireless device for receiving user data at a host computer according to some embodiments of the present disclosure.

DETAILED DESCRIPTION

Figure 1:
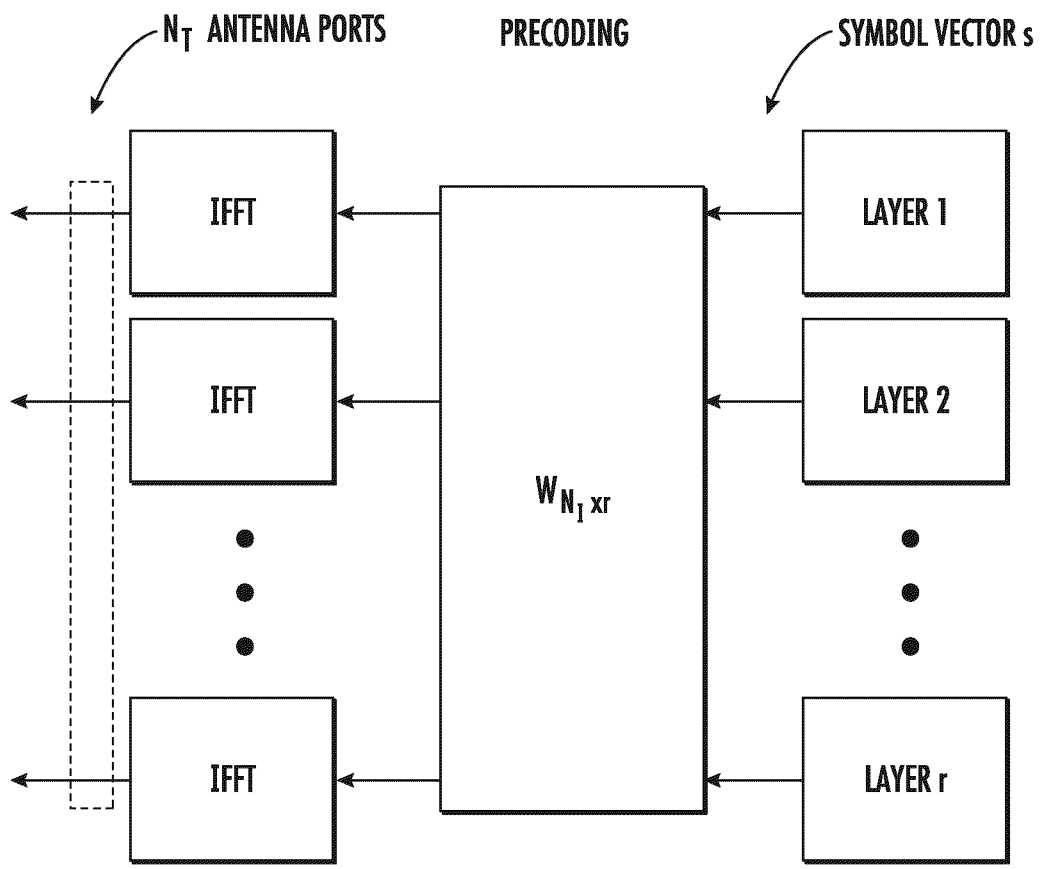
FIG. 1 is a block diagram of a spatial multiplexing operation.
Figure 2:
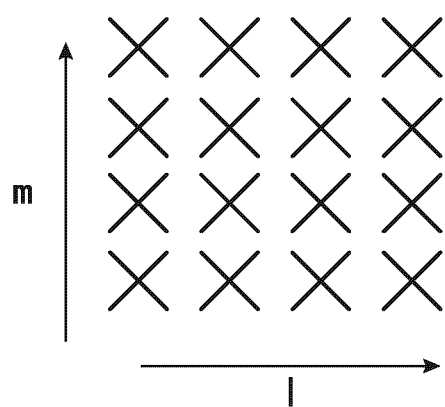
FIG. 2 is a two dimensional array of cross-polarized antenna elements.
Figure 3:
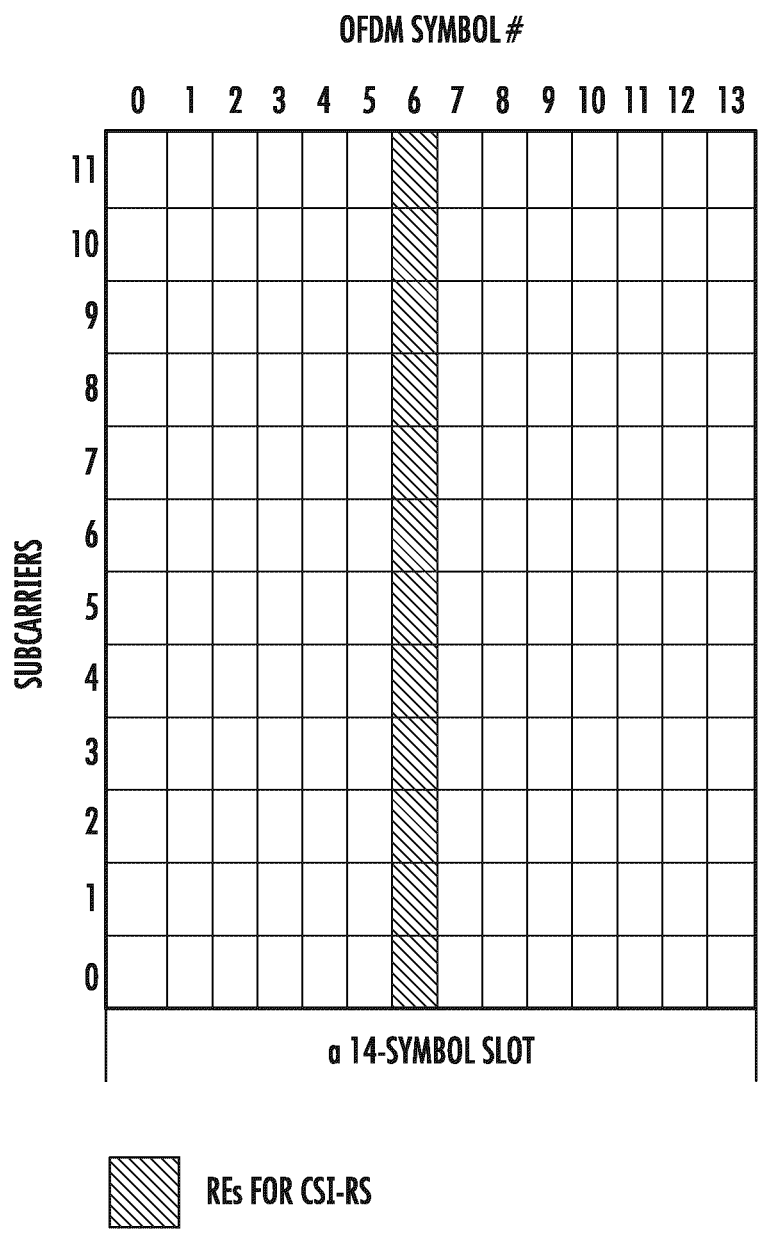
FIG. 3 is a diagram of CSI-RS resource elements.
Figure 4:
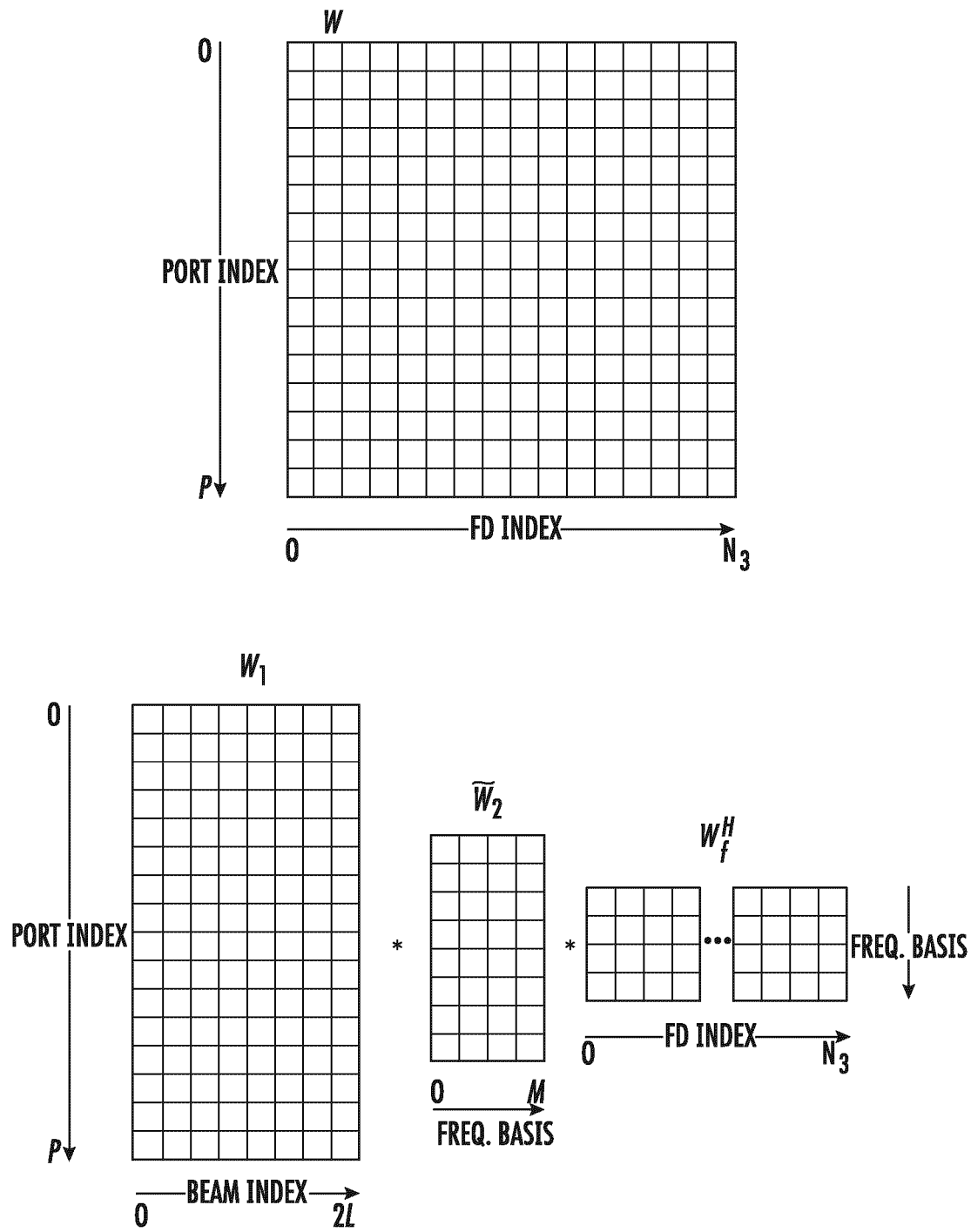
FIG. 4 is a diagram of a codebook structure.
Figure 5:
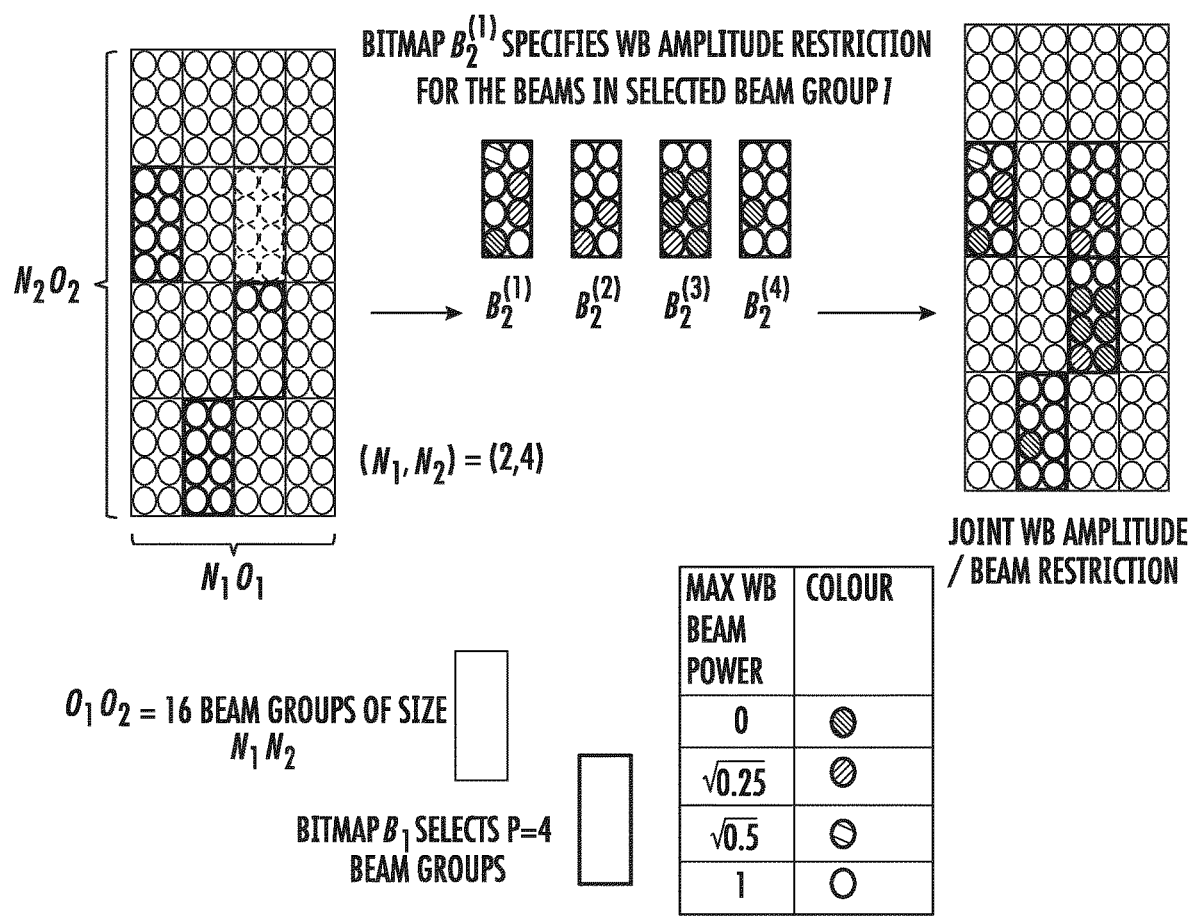
FIG. 5 is a bitmapping scheme.

Before describing in detail exemplary embodiments, it is noted that the embodiments reside primarily in combinations of apparatus components and processing steps related to codebook subset restriction for frequency-parameterized linear combination codebooks. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A method and a wireless device are disclosed. According to one aspect, a method includes receiving subset restrictions that include an indication of a maximum power level associated with a spatial domain basis vector. The method includes determining when a combination of values of a plurality of amplitude coefficients results in exceeding the indicated maximum power level. The method further includes, responsive to the determining, refraining from reporting the combination of values in a report to the network node when the maximum power level is exceeded.

Figure 6:
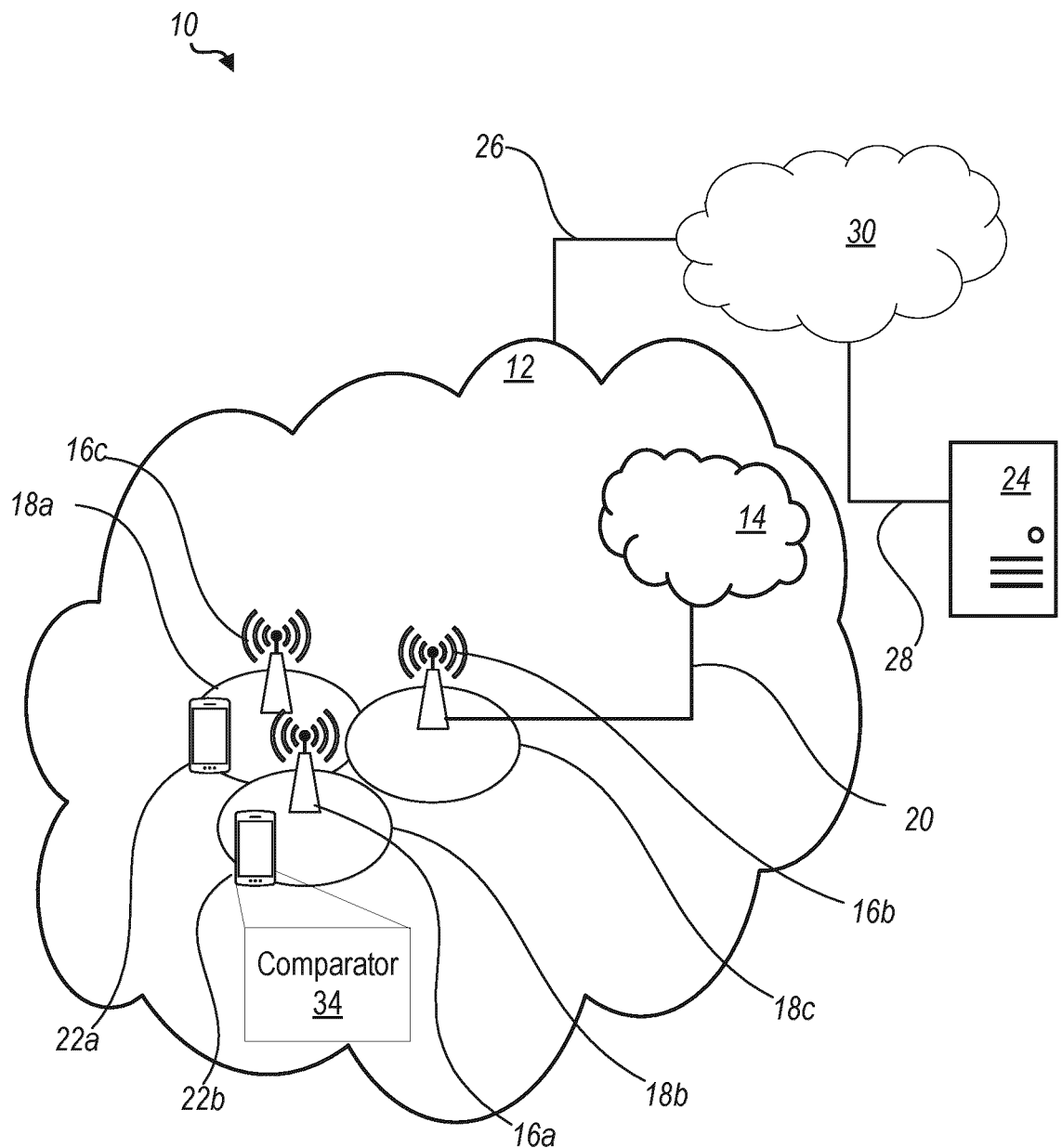
FIG. 6 is a schematic diagram of an exemplary network architecture illustrating a communication system connected via an intermediate network to a host computer according to the principles in the present disclosure.

Returning again to the drawing figures, in which like elements are referred to by like reference numerals, there is shown in FIG. 6 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*c*. A second WD 22*b* in coverage area 18*b* is wirelessly connectable to the corresponding network node 16*a*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 6 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A wireless device 22 is configured to include a comparator unit 34 which is configured to include a comparator unit 34 configured to determine when a combination of values of a plurality of amplitude coefficients results in exceeding the indicated maximum power level.

Example implementations, in accordance with an embodiment, of the WD 22, network node 16 and host computer 24 discussed in the preceding paragraphs will now be described with reference to FIG. 7. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16.

The radio interface 62 may be formed as or may include, for example, one or more RF transmitters, one or more RF receivers, and/or one or more RF transceivers. The radio interface 62 may include an array 63 of antenna element. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers. The radio interface 82 may include an array 83 of antennas.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a comparator unit 34 configured to determine when a combination of values of a plurality of amplitude coefficients results in exceeding the indicated maximum power level.

Figure 7:
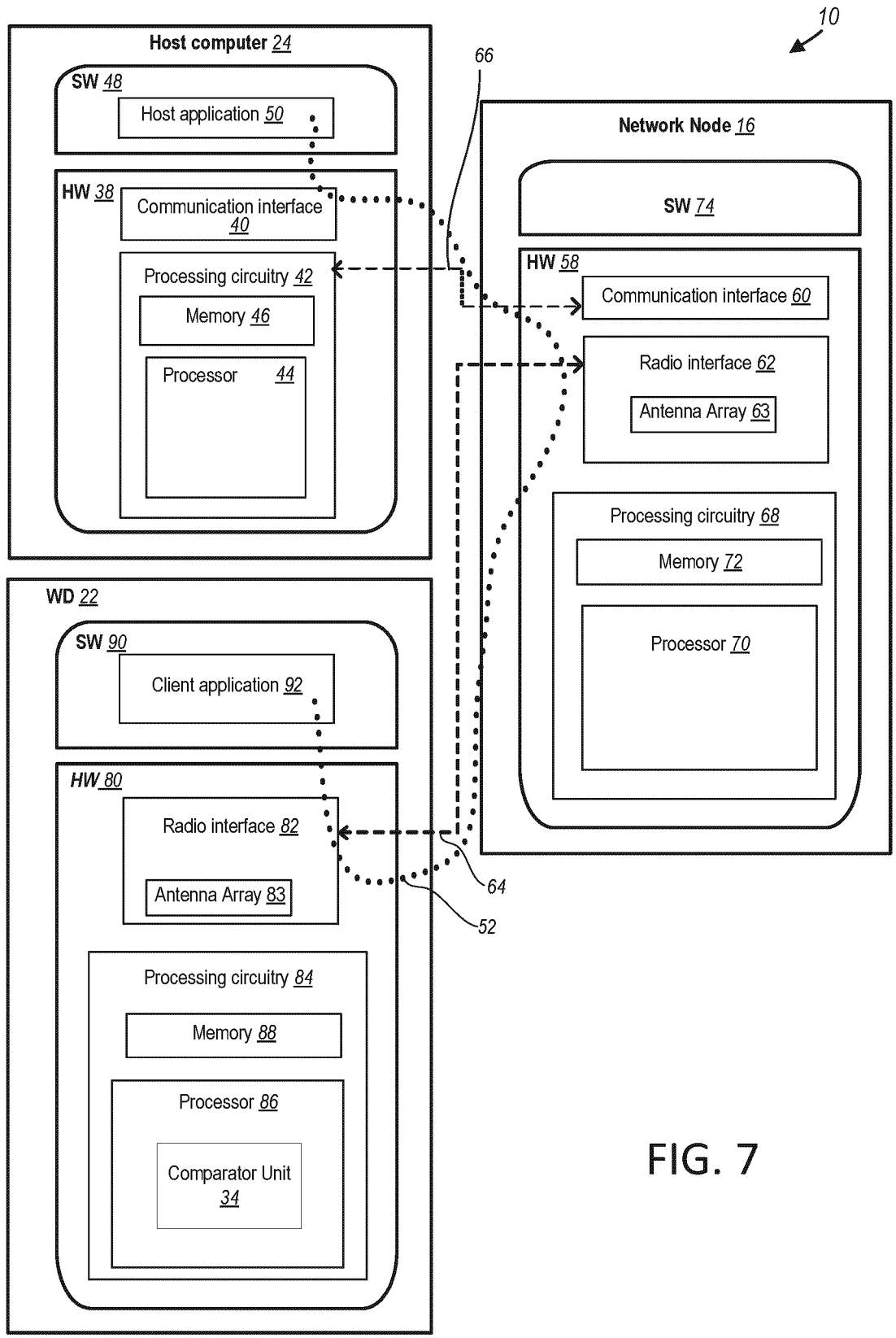
FIG. 7 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 7 and independently, the surrounding network topology may be that of FIG. 6.

In FIG. 7, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 7 and 6 show various "units" such as comparator unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 8, 9:
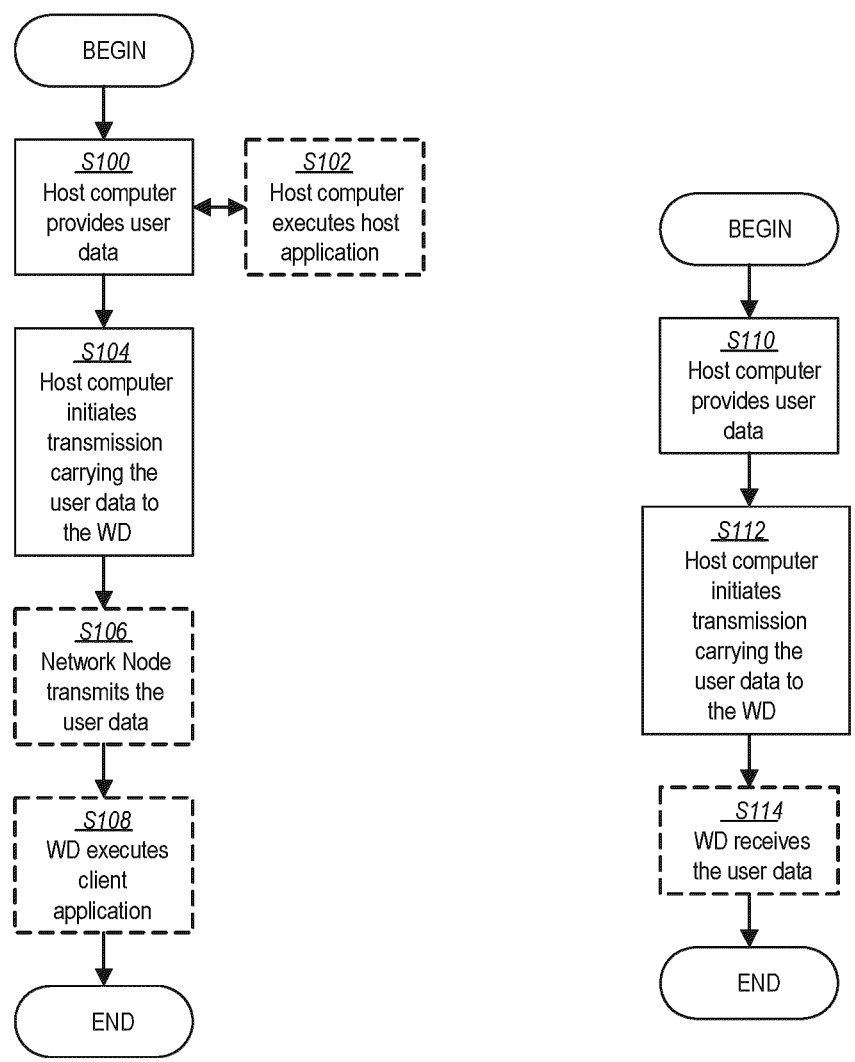
FIG. 8 is a flowchart illustrating example methods implemented in a communication system including a host computer, a network node and a wireless device for executing a client application at a wireless device according to some embodiments of the present disclosure.
FIG. 9 is a flowchart illustrating example methods implemented in a communication system including a host computer, a network node and a wireless device for receiving user data at a wireless device according to some embodiments of the present disclosure.

FIG. 8 is a flowchart illustrating an example method implemented in a communication system, such as, for example, the communication system of FIGS. 7 and 6, in accordance with one embodiment. The communication system may include a host computer 24, a network node 16 and a WD 22, which may be those described with reference to FIG. 7. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 9 is a flowchart illustrating an example method implemented in a communication system, such as, for example, the communication system of FIG. 6, in accordance with one embodiment. The communication system may include a host computer 24, a network node 16 and a WD 22, which may be those described with reference to FIGS. 7 and 6. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 10 is a flowchart illustrating an example method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 11 is a flowchart illustrating an example method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 12:
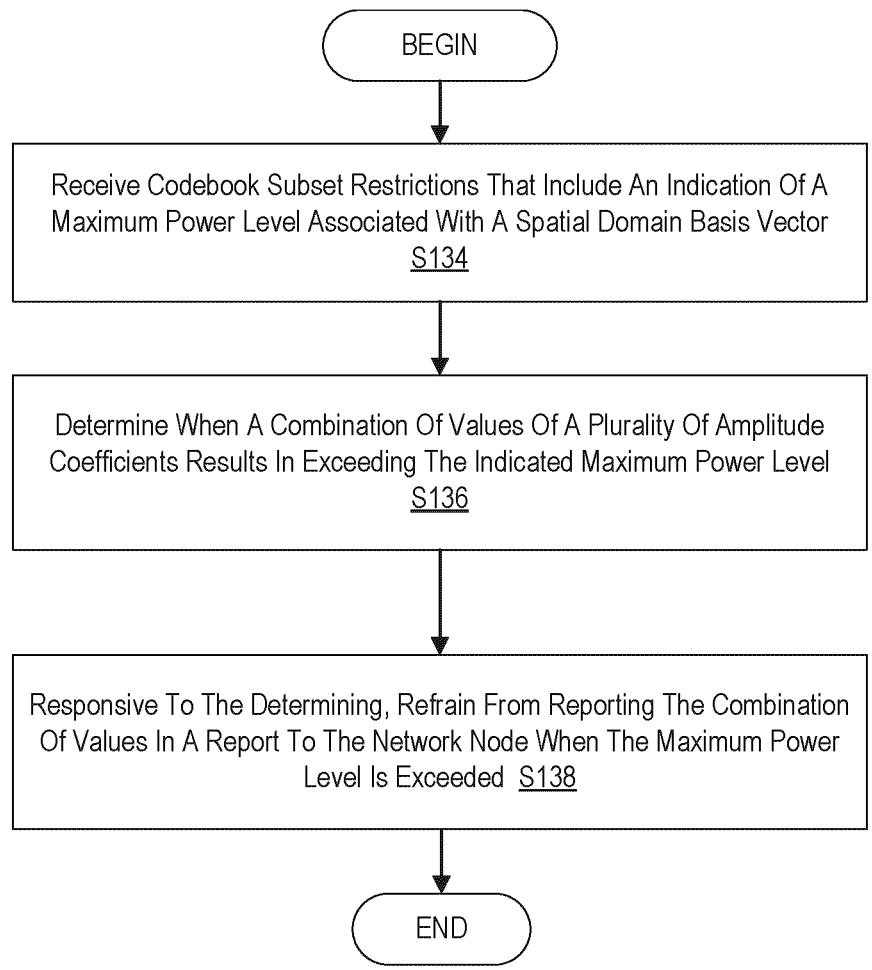
FIG. 12 is a flowchart of an example process in a wireless device according to some embodiments of the present disclosure.

FIG. 12 is a flowchart of an example process in a wireless device 22 according to some embodiments of the present disclosure. One or more blocks described herein may be performed by one or more elements of wireless device 22 such as by one or more of processing circuitry 84 (including the comparator unit 34), processor 86, radio interface 82 and/or communication interface 60. Wireless device 22 such as via processing circuitry 84 and/or processor 86 and/or radio interface 82 is configured to receive codebook subset restrictions that include an indication of a maximum power level associated with a spatial domain basis vector (Block S134). The process includes determining when a combination of values of a plurality of amplitude coefficients results in exceeding the indicated maximum power level (Block S136). The process also includes, responsive to the determining, refraining from reporting the combination of values in a report to the network node when the maximum power level is exceeded (Block S138).

Figure 13:
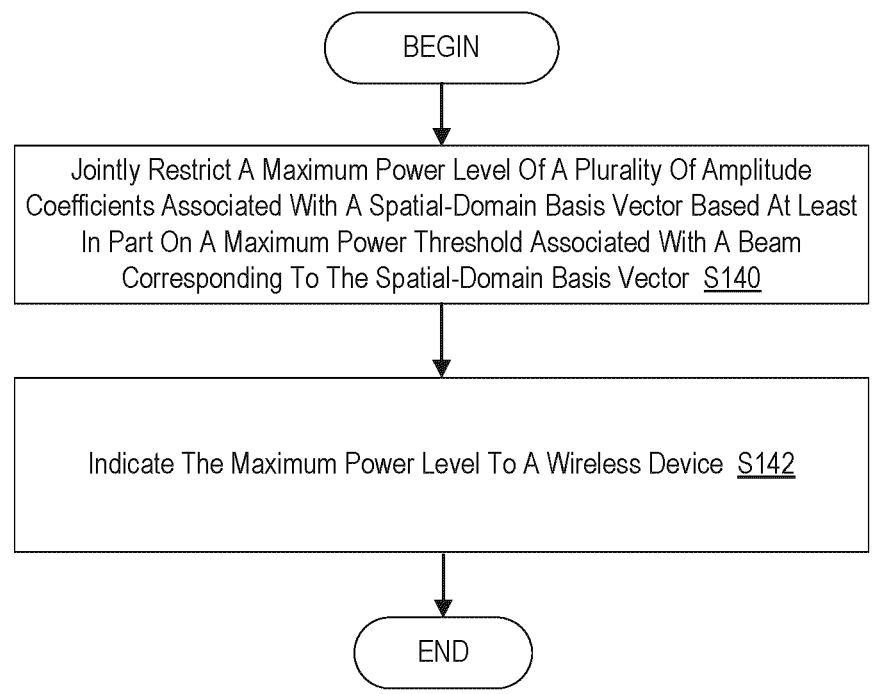
FIG. 13 is a flowchart of an example process in a network node for jointly restricting a maximum power level of a plurality of amplitude coefficients.

FIG. 13 is a flowchart of an example process in a network node 16 for jointly restricting a maximum power level of a plurality of amplitude coefficients. The process includes jointly restricting, via the processing circuitry 68, a maximum power level of a plurality of amplitude coefficients associated with a spatial-domain basis vector based at least on part on a maximum power threshold associated with a beam corresponding to the spatial-domain basis vector (Block S140). The process also includes indicating, via the radio interface 62, the maximum power level to a wireless device (Block S142).

Figure 14:
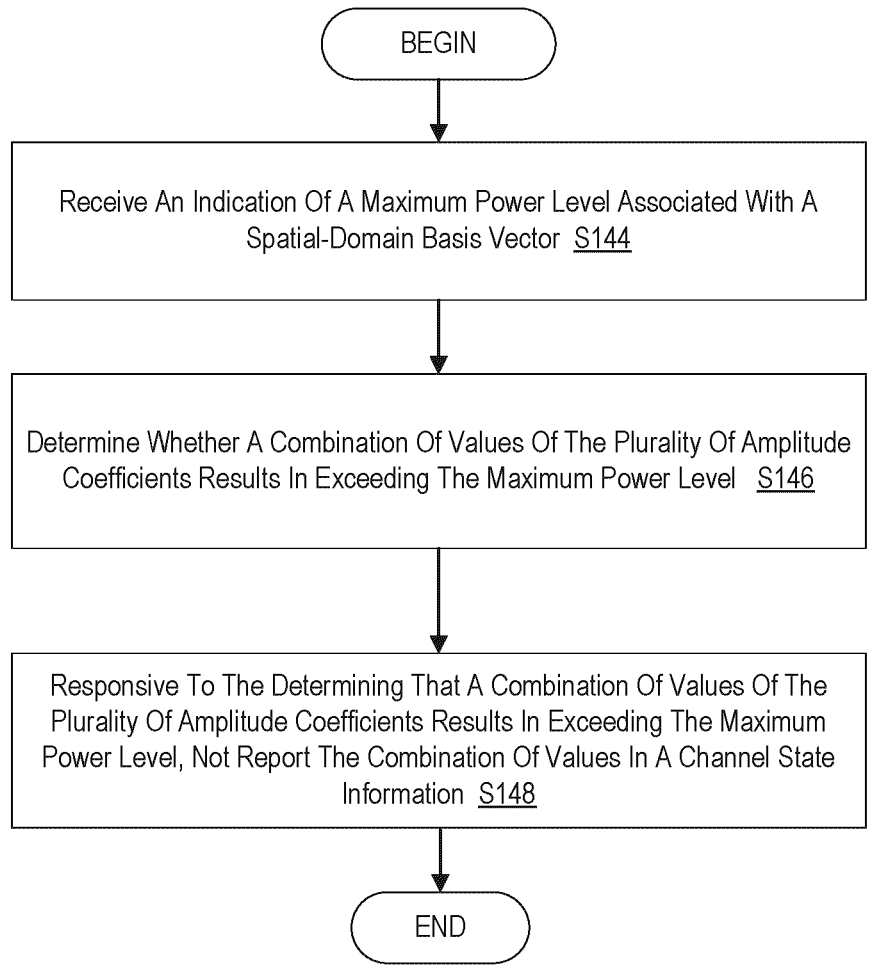
FIG. 14 is a flowchart of an example process in a wireless device for determining whether to not report a combinations of values of a plurality of amplitude coefficients.

FIG. 14 is a flowchart of an example process in a WD 22 for determining whether to not report a combinations of values of a plurality of amplitude coefficients. The process includes receiving, via the radio interface 82 an indication of a maximum power level associated with a spatial-domain basis vector (Block S144). The process also includes determining, via the processing circuitry 84 whether a combination of values of the plurality of amplitude coefficients results in exceeding the maximum power level (Block S146). The process also includes, responsive to determining that a combination of values of the plurality of amplitude coefficients results in exceeding the maximum power level, then not reporting the combination of values in a channel state information, CSI, report (Block S148).

Having described the general process flow of arrangements of the disclosure and having provided examples of hardware and software arrangements for implementing the processes and functions of the disclosure, the sections below provide details and examples of arrangements for codebook subset restriction for frequency-parameterized linear combination codebooks.

A task of defining a joint beam-amplitude level CBSR is to control the total radiated power of the precoder in certain spatial directions. That is, it may be beneficial to disallow the WD 22 from recommending precoders which transmit any power in some spatial directions (i.e., in certain spatial beams) while for other spatial directions it may be sufficient to restrict the power level to some value larger than zero, i.e., still allowing transmissions in these directions but not at full power. The 3GPP Rel-15 Type II CBSR restricts the maximum power level of each wideband (WB) amplitude coefficient associated with a certain spatial beam individually. This allows for an easy WD implementation in that it can simply avoid reporting a higher WB amplitude level than what has been indicated with the CBSR (and choose to not select the spatial beam in the first place if the maximum amplitude value for that spatial beam has been set to zero). This arrangement furthermore also corresponds quite well to the actually radiated power in that spatial direction, since in the 3GPP Rel-15 codebook, there can be at most 4 wideband amplitude coefficients associated with a certain spatial beam, since there is one wideband amplitude coefficient for each of the two polarizations and up to two transmission layers.

However, in the 3GPP Rel-16 codebook, which includes a plurality of LC coefficients $$c_{l,m,i} = p_{ref,i}\left(\left\lfloor\frac{l}{L}\right\rfloor\right) \times p(l, m, i) \times \varphi(l, m, i)$$

for spatial-polarization beams $l=0, \ldots, 2L-1$, FD-components $m=0, \ldots, M-1$ and layers $i=0, \ldots, RI-1$. There are many more amplitude coefficients associated with a certain spatial beam $l_0$, namely the set of resulting amplitude coefficients $p_{res,l_0}(i, m, k) = p_{ref,i}(k) \times p(L \cdot k + l_0, m, i)$, $m=0, \ldots, M-1$, $i=0, \ldots, RI-1$, $k=0,1$. Here k denotes the polarization index. Since the maximum rank (and hence the maximum RI value) for the Rel-16 codebook is 4 and the maximum number of FD-components M is 10, and the set of $p_{res,l_0}(i, m, k)$ amplitude coefficients associated with a certain spatial beam $l_0$ can be up to $4 \cdot 10 \cdot 2 = 80$. Thus, it does not make sense to individually restrict the each of these up to 80 amplitude coefficients, they should be considered jointly.

Consider an example where a WD 22 sets one of these 80 amplitude coefficients to be 1 and the remaining are set to zero (note: setting an amplitude coefficient to zero is achieved by indicating that the coefficient is not present in the CSI report by setting the corresponding bit in the NNZC bitmap), while in a second case the WD 22 sets all of these amplitude coefficients to be for instance ⅛. The total radiated power in the spatial beam direction for the second case will be $$\frac{80 \cdot \left(\frac{1}{4}\right)^2}{1} = 5$$

times larger than for the first case, but if individual restriction of each amplitude coefficient is used, it is more likely that the first case will be disallowed while the second case is allowed. Clearly, this is not beneficial.

Therefore, the present disclosure herein proposes a method for CBSR where a plurality of amplitude coefficients associated with a spatial-domain basis vector are jointly restricted based on a single indicated maximum power level associated with the spatial beam.

In an example embodiment, the CBSR method comprises signaling a maximum power level threshold $y_{l_0}$ for a certain spatial basis vector (identified by the index $l_0$ in this example). The CBSR method further comprises a rule which states that the sum of the square of the resulting amplitude coefficients associated with the spatial beam $l_0$ (i.e. the power contributions corresponding to this spatial beam) as a ratio relative the total power of the precoder (i.e. the power contributions of all resulting amplitude coefficients do not exceed the threshold $y_{l_0}$. That is, the following inequality should hold:

$$\frac{\sum_{i=0}^{RI-1}\sum_{m=0}^{M-1}\sum_{k=0}^{1}p_{res,l_0}^2(i,m,k)}{\sum_{i=0}^{RI-1}\sum_{m=0}^{M-1}\sum_{k=0}^{1}\sum_{l=0}^{L-1}p_{res,l}^2(i,m,k)} =$$

$$\frac{\sum_{i=0}^{RI-1}\sum_{m=0}^{M-1}\sum_{k=0}^{1}p_{ref,i}^2(k) \times p^2(L \cdot k + l_0, m, i)}{\sum_{i=0}^{RI-1}\sum_{m=0}^{M-1}\sum_{k=0}^{1}\sum_{l=0}^{L-1}p_{ref,i}^2(k) \times p^2(L \cdot k + l, m, i)} \leq \gamma_{l_0}$$

In this example embodiment, the power contributions for all transmission layers are thus included, i.e. there is a joint restriction across the transmission layers. In other embodiments, the restriction may be performed layer-wise so that the plurality of amplitude coefficients only comprise coefficients associated with a certain layer. Similarly, the coefficients for both polarizations k=0,1 of a spatial beam are included in the same restriction rule in this example embodiment, but in other embodiments, the restriction may be performed polarization-wise, i.e. independently for k=0 and k=1. Note that, in the 3GPP specifications, is assumed that the first polarization k=0 corresponds to the first half of the antenna ports of the CSI-RS resource and the second polarization k=1 corresponds to the second half of the antenna ports of the CSI-RS resource. Thus, the use of the terminology "polarization" may be seen as a colloquialism and should more properly be referred to as spatial basis vectors mapping to certain antenna port groups (i.e., first half of antennas and second half antennas constitute respective antenna port groups).

In some embodiments the restriction on the resulting amplitude coefficients $p_{res,l_0}(i, m, k)=p_{ref,i}(k) \times p(L \cdot k+l_0, m, i)$ may be interpreted to imply an implicit restriction on both the reference amplitude $p_{ref,i}(k)$ an the amplitude coefficients $p(L \cdot k+l_0, m, i)$.

In the embodiments above, the ratio is given in the power-domain. In alternative embodiments, the ratio may be given in the amplitude-domain implying that a square root should be applied to the left-hand side of the inequality.

The CBSR method as described above only describes the restriction of a single spatial beam $l_0$. The CBSR information is of course given for all candidate spatial beams in a practical application. In one embodiment, the maximum power thresholds for all $N_1N_2O_1O_2$ candidate spatial beams are indicated as a list of $N_1N_2O_1O_2$ values of y, i.e. [$y_0y_1 \ldots y_{N_1N_0O_1O_2-1}$]. Each y-value may be encoded into a number of B bits and the resulting CBSR signaling may be conveyed as a size B·$N_1N_2O_1O_2$ bitmap. This bitmap may be configured to the WD 22 over RRC in CodebookConfig comprised in CSI-ReportConfig Information Element (IE).

In another embodiment, the spatial beam-specific maximum power thresholds are only given for a subset of the $N_1N_2O_1O_2$ candidate spatial beams. For instance, the same method of indicating a spatial beam subset as for the 3GPP Rel-15 Type II CBSR may be used. This may imply that no restriction is imposed on the remaining spatial beam not comprised in the subset.

The maximum power thresholds y may take values from a predefine value range. For instance, $\gamma \in \{0, 0.25, 0.5, 0.75, 1\}$ or some other value range. In this example, a value of $\gamma=0$ implies that the spatial beam cannot be used while a value of $\gamma=1$ implies that there is no restriction. In another embodiment, the maximum power level threshold of a spatial beam is given as an absolute value rather than a value relative to the total precoder power, in that case the restriction rule may be that the inequality $$\sum_{i=0}^{RI-1}\sum_{m=0}^{M-1}\sum_{k=0}^{1}p_{res,l_0}^2(i,m,k) \leq \gamma_{l_0}$$

should hold. Alternatively, the threshold is given in the amplitude domain rather than the power domain (that is, a square root is applied to the left-hand side of the above inequality).

Some embodiments are performed by a wireless device 22, for codebook subset restriction (CBSR) of a precoder codebook comprising a plurality of amplitude coefficients associated with a spatial-domain basis vector, the plurality of amplitude coefficients further being associated at least two frequency-domain basis vectors. According to one aspect, the method may include:
  a) Receiving CBSR signaling comprising an indication of a maximum power level associated with the spatial-domain basis vector;
  b) Determining whether a certain combination of values of the plurality of amplitude coefficients results in exceeding the indicated the maximum power level; and
  c) Responsive to the determining, not reporting the certain combination of values of the plurality of amplitude coefficients in a Channel State Information (CSI) report if the maximum power level is exceeded.

In some embodiments, the maximum power level associated with the spatial-domain basis vector is a relative power level of the total precoder power. In some embodiments, the spatial-domain basis vector is associated with two polarizations or antenna port groups, and the plurality of amplitude coefficients include coefficients associated with each of the two polarizations or antenna port groups. In some embodiments, the plurality of amplitude coefficients comprise coefficients associated with one or more transmission layers. In some embodiments, the plurality of amplitude coefficients comprise two coefficients associated with the same transmission layer and the same polarization or antenna port groups. In some embodiments, the CBSR further comprises selecting the spatial-domain basis vector as part of a subset of spatial-domain basis vectors Thus, according to one aspect, a method in a network node 16 for codebook subset restriction, CBSR, includes jointly restricting, via processing circuitry 68, a maximum power level of a plurality of amplitude coefficients associated with a spatial-domain basis vector based at least on part on a maximum power threshold associated with a beam corresponding to the spatial-domain basis vector. The method further includes indicating, via the radio interface 62, the maximum power level to a wireless device, WD 22.

According to this aspect, in some embodiments, the jointly restricting includes restricting a sum of squares of the amplitude coefficients to be less than the maximum power threshold. In some embodiments, the jointly restricting includes restricting a sum of squares of the amplitude coefficients relative to a total power of a precoder to be less than the maximum power threshold. In some embodiments, the jointly restricting includes restricting a square root of a sum of squares of the amplitude coefficients to be less than the maximum power threshold. In some embodiments, the jointly restricting is applied to multiple layers of transmission. In some embodiments, the jointly restricting is applied separately for each of a plurality of layers of transmission. In some embodiments, the jointly restricting is applied separately for each of a plurality of polarizations. In some embodiments, the jointly restricting is applied separately for each of a plurality of sets of antenna ports. In some embodiments, the jointly restricting is applied for each of a plurality of beams in a subset of beams. In some embodiments, the indicating includes indicating a maximum power level and indicating for which beams in the subset of beams the maximum power level applies. In some embodiments, a maximum power threshold associated with a beam is selected, via the processing circuitry 68, from a range that includes zero.

According to another aspect, a network node 16 for codebook subset restriction, CBSR, is provided. The network node 16 includes processing circuitry 68 configured to jointly restrict a maximum power level of a plurality of amplitude coefficients associated with a spatial-domain basis vector based at least in part on a maximum power threshold associated with a beam corresponding to the spatial-domain basis vector. The network node 16 also includes a radio interface 62 in communication with the processing circuitry, the radio interface configured to indicate the maximum power level to a wireless device, WD 22.

In some embodiments, the jointly restricting includes restricting a sum of squares of the amplitude coefficients to be less than the maximum power threshold. In some embodiments, the jointly restricting includes restricting a sum of squares of the amplitude coefficients relative to a total power of a precoder to be less than the maximum power threshold. In some embodiments, the jointly restricting includes restricting a square root of a sum of squares of the amplitude coefficients to be less than the maximum power threshold. In some embodiments, the jointly restricting is applied to multiple layers of transmission. In some embodiments, the jointly restricting is applied separately for each of a plurality of layers of transmission. In some embodiments, the jointly restricting is applied separately for each of a plurality of polarizations. In some embodiments, the jointly restricting is applied separately for each of a plurality of sets of antenna ports. In some embodiments, the jointly restricting is applied for each of a plurality of beams in subset of beams. In some embodiments, the indicating includes indicating a maximum power level and indicating for which beams in the subset of beams the maximum power level applies. In some embodiments, a maximum power threshold associated with a beam is selected from a range that includes zero.

According to yet another aspect, a method in a wireless device, WD 22, for codebook subset restriction, CBSR, is provided. The method includes receiving, via the radio interface 82, an indication of a maximum power level associated with a spatial-domain basis vector. The method also includes determining, via the processing circuitry 84, whether a combination of values of the plurality of amplitude coefficients results in exceeding the maximum power level. The method also includes responsive to determining that a combination of values of the plurality of amplitude coefficients results in exceeding the maximum power level, not reporting the combination of values in a channel state information, CSI, report.

According to this aspect, in some embodiments, the determining includes determining when a sum of squares of the amplitude coefficients is less than the maximum power threshold. In some embodiments, the determining includes determining when a sum of squares of the amplitude coefficients relative to a total power of a precoder is less than the maximum power threshold. In some embodiments, the determining includes determining when a square root of a sum of squares of the amplitude coefficients is less than the maximum power threshold. In some embodiments, the determining is applied to multiple layers of transmission. In some embodiments, the determining is applied separately for each of a plurality of layers of transmission. In some embodiments, the determining is applied separately for each of a plurality of polarizations. In some embodiments, the determining is applied separately for each of a plurality of sets of antenna ports. In some embodiments, the determining is applied for each of a plurality of beams in a subset of beams. In some embodiments, the determining includes determining which beams in the subset of beams the maximum power level applies. In some embodiments, the determining includes comparing the combination of values to a maximum power threshold selected from a range that includes zero, zero indicating that the beam is not to be used by the WD 22. In some embodiments, the maximum power level is relative to a total precoder power. In some embodiments, the maximum power level is associated with a particular one of a plurality of polarizations. In some embodiments, the maximum power level is associated with a particular transmission layer. In some embodiments, the maximum power level is associated with a group of transmission layers.

According to another aspect, a WD 22, for codebook subset restriction, CBSR, is provided. The WD 22 includes a radio interface 82 configured to receive an indication of a maximum power level associated with a spatial-domain basis vector. The WD 22 also includes processing circuitry 84 in communication with the radio interface 82, the processing circuitry 84 configured to: determine whether a combination of values of the plurality of amplitude coefficients results in exceeding the maximum power level; and responsive to the determining that a combination of values of the plurality of amplitude coefficients results in exceeding the maximum power level, not report the combination of values in a channel state information, CSI, report.

According to this aspect, in some embodiments, the determining includes determining when a sum of squares of the amplitude coefficients is less than the maximum power threshold. In some embodiments, the determining includes determining when a sum of squares of the amplitude coefficients relative to a total power of a precoder is less than the maximum power threshold. In some embodiments, the determining includes determining when a square root of a sum of squares of the amplitude coefficients is less than the maximum power threshold. In some embodiments, the determining is applied to multiple layers of transmission. In some embodiments, the determining is applied separately for each of a plurality of layers of transmission. In some embodiments, the determining is applied separately for each of a plurality of polarizations. In some embodiments, the determining is applied separately for each of a plurality of sets of antenna ports. In some embodiments, the determining is applied for each of a plurality of beams in a subset of beams. In some embodiments, the determining includes determining which beams in the subset of beams the maximum power level applies. In some embodiments, the determining includes comparing the combination of values to a maximum power threshold selected from a range that includes zero, zero indicating that the beam is not to be used by the WD 22. In some embodiments, the maximum power level is relative to a total precoder power. In some embodiments, the maximum power level is associated with a particular one of a plurality of polarizations. In some embodiments, the maximum power level is associated with a particular transmission layer. In some embodiments, the maximum power level is associated with a group of transmission layers.

According to one aspect, a wireless device 22 is provided, having processing circuitry 84 and/or processor 86 and/or radio interface 82 configured to: receive codebook subset restrictions that include an indication of a maximum power level associated with a spatial domain basis vector. The processing circuitry 84 and/or processor 86 and/or radio interface 82 is also configured to determine when a combination of values of a plurality of amplitude coefficients results in exceeding the indicated maximum power level and, responsive to the determining, refrain from reporting the combination of values in a report to the network node 16 when the maximum power level is exceeded.

According to this aspect, in some embodiments, the maximum power level associated with the spatial-domain basis vector is a relative power level of the total precoder power. In some embodiments, the spatial-domain basis vector is associated with two polarizations or alternative antenna port groups and the plurality of amplitude coefficients comprise coefficients associated with each of the two polarizations.

According to another aspect, a method in a wireless device 22 includes receiving subset restrictions that include an indication of a maximum power level associated with a spatial domain basis vector. The method also includes determining when a combination of values of a plurality of amplitude coefficients results in exceeding the indicated maximum power level, and, responsive to the determining, refraining from reporting the combination of values in a report to the network node 16 when the maximum power level is exceeded. According to this aspect, in some embodiments, the maximum power level associated with the spatial-domain basis vector is a relative power level of the total precoder power. In some embodiments, the spatial-domain basis vector is associated with two polarizations or alternative antenna port groups and the plurality of amplitude coefficients comprise coefficients associated with each of the two polarizations.

According to yet another embodiment, a wireless device (WD) 22 configured to communicate with a network node 16, includes processing circuitry configured to receive codebook subset restrictions that include an indication of a maximum of minimum value of a parameter associated with a spatial domain basis vector; determine when a combination of values of a plurality of precoder coefficients results in exceeding the indicated maximum parameter value or is less than the indicated minimum parameter value; and responsive to the determining, refrain from reporting the combination of values in a report to the network node 16 when the maximum parameter value is exceeded or is less than the indicated minimum parameter value.

According to another aspect, a method in a wireless device (WD) 22 configured to communicate with a network node 16 includes receiving codebook subset restrictions that include an indication of a maximum or minimum value of a parameter associated with a spatial domain basis vector; determining when a combination of values of a plurality of precoder coefficients results in exceeding the indicated maximum parameter value or is less than the indicated minimum parameter value; and responsive to the determining, refrain from reporting the combination of values in a report to the network node 16 when the maximum parameter value is exceeded or is less than the indicated minimum parameter value.

Embodiment A1. A wireless device (WD) configured to communicate with a network node, the WD configured to, and/or comprising a radio interface and/or processing circuitry configured to:

receive codebook subset restrictions that include an indication of a maximum power level associated with a spatial domain basis vector;

determine when a combination of values of a plurality of amplitude coefficients results in exceeding the indicated maximum power level; and responsive to the determining, refrain from reporting the combination of values in a report to the network node when the maximum power level is exceeded.

Embodiment A2. The WD of Embodiment A1, where the maximum power level associated with the spatial-domain basis vector is a relative power level of the total precoder power.

Embodiment A3. The WD of Embodiment A1, where the spatial-domain basis vector is associated with two polarizations or alternative antenna port groups and the plurality of amplitude coefficients comprise coefficients associated with each of the two polarizations.

Embodiment B 1. A method implemented in a wireless device (WD), the method comprising:

receiving subset restrictions that include an indication of a maximum power level associated with a spatial domain basis vector;

determining when a combination of values of a plurality of amplitude coefficients results in exceeding the indicated maximum power level; and responsive to the determining, refraining from reporting the combination of values in a report to the network node when the maximum power level is exceeded.

Embodiment B2. The method of Embodiment B1, where the maximum power level associated with the spatial-domain basis vector is a relative power level of the total precoder power.

Embodiment B3. The method of Embodiment B1, where the spatial-domain basis vector is associated with two polarizations or alternative antenna port groups and the plurality of amplitude coefficients comprise coefficients associated with each of the two polarizations.

Embodiment C1. A wireless device (WD) configured to communicate with a network node, the WD configured to, and/or comprising a radio interface and/or processing circuitry configured to:

receive codebook subset restrictions that include an indication of a maximum or minimum value of a parameter associated with a spatial domain basis vector;

determine when a combination of values of a plurality of precoder coefficients results in exceeding the indicated maximum parameter value or is less than the indicated minimum parameter value; and responsive to the determining, refrain from reporting the combination of values in a report to the network node when the maximum parameter value is exceeded or is less than the indicated minimum parameter value.

Embodiment D1. A method in a wireless device (WD) configured to communicate with a network node, the method comprising:

receiving codebook subset restrictions that include an indication of a maximum or minimum value of a parameter associated with a spatial domain basis vector;

determining when a combination of values of a plurality of precoder coefficients results in exceeding the indicated maximum parameter value or is less than the indicated minimum parameter value; and responsive to the determining, refrain from reporting the combination of values in a report to the network node when the maximum parameter value is exceeded or is less than the indicated minimum parameter value.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node for codebook subset restriction, CBSR, of a Type II codebook, the method comprising:
    jointly restricting a maximum power level of amplitude coefficients of a spatial-domain basis vector of the codebook by restricting a square root of a sum of squares of the amplitude coefficients to be less than a maximum power threshold associated with a beam corresponding to the spatial-domain basis vector; and
    indicating the maximum power threshold to a wireless device, WD, to be used by the WD for determining whether the square root of the sum of the squares of the amplitude coefficients exceeds the maximum power threshold.

2. A network node for codebook subset restriction, CBSR, of a Type II codebook, the network node comprising:
    processing circuitry configured to jointly restrict a maximum power level of a amplitude coefficients of a spatial-domain basis vector of the codebook by restricting a square root of a sum of squares of the amplitude coefficients to be less than a maximum power threshold associated with a beam corresponding to the spatial-domain basis vector; and
    a radio interface in communication with the processing circuitry, the radio interface configured to indicate the maximum power threshold to a wireless device, WD, to be used by the WD for determining whether the square root of the sum of the squares of the amplitude coefficients exceeds the maximum power threshold.

3. The network node of claim 2, wherein the jointly restricting is applied to multiple layers of transmission.

4. The network node of claim 2, wherein the jointly restricting is applied separately for each of a plurality of layers of transmission.

5. The network node of claim 2, wherein the jointly restricting is applied separately for each of a plurality of polarizations.

6. The network node of claim 2, wherein the jointly restricting is applied separately for each of a plurality of sets of antenna ports.

7. The network node of claim 2, wherein the jointly restricting is applied for each of a plurality of beams in subset of beams.

8. The network node of claim 7, wherein the indicating includes indicating a maximum power level and indicating for which beams in the subset of beams the maximum power level applies.

9. The network node of claim 2, wherein a maximum power threshold associated with a beam is selected from a range that includes zero, zero indicating that the beam is not to be used by the WD.

10. A method in a wireless device, WD, for codebook subset restriction, CBSR, of a Type II codebook, the method comprising:
    receiving an indication of a maximum power threshold associated with a spatial-domain basis vector of the codebook;
    determining whether a square root of the sum of squares of amplitude coefficients of the spatial domain vector exceeds the maximum power threshold; and
    responsive to determining that the square root of the sum of squares of the amplitude coefficients exceeds the maximum power threshold not reporting the amplitude coefficients in a channel state information, CSI, report.

11. A wireless device, WD, for codebook subset restriction, CBSR, of a Type II codebook, the WD comprising:
    a radio interface configured to receive an indication of a maximum power threshold associated with a spatial-domain basis vector of the codebook; and
    processing circuitry in communication with the radio interface, the processing circuitry configured to:
        determine whether a square root of the sum of squares of amplitude coefficients of the spatial domain vector exceeds the maximum power threshold; and
        responsive to the determining that the square root of the sum of squares of the amplitude coefficients exceeds the maximum power level threshold not reporting the amplitude coefficients in a channel state information, CSI, report.

12. The WD of claim 11, wherein the determining is applied to multiple layers of transmission.

13. The WD of claim 11, wherein the determining applied separately for each of a plurality of layers of transmission.

14. The WD of claim 11, wherein the determining is applied separately for each of a plurality of polarizations.

15. The WD of claim 11, wherein the determining is applied separately for each of a plurality of sets of antenna ports.

16. The WD of claim 11, wherein the determining is applied for each of a plurality of beams in a subset of beams.

17. The WD of claim 16, wherein the determining includes determining which beams in the subset of beams the maximum power level applies.

18. The WD of claim 11, wherein the determining includes comparing the combination of values to a maximum power threshold selected from a range that includes zero, zero indicating that the beam is not to be used by the WD.

19. The WD of claim 11 wherein the maximum power level is relative to a total precoder power.

20. The WD of claim 11, wherein the maximum power level is associated with a particular one of a plurality of polarizations.

21. The WD of claim 11, wherein the maximum power level is associated with a particular transmission layer.

22. The WD of claim 11, wherein the maximum power level is associated with a group of transmission layers.

* * * * *